United States Patent [19]

Conrad

[11] 4,424,619
[45] Jan. 10, 1984

[54] POSITIVE DRIVE SYSTEM

[76] Inventor: René A. Conrad, 215 Olive Hill La., Woodside, Calif. 94062

[21] Appl. No.: 334,831

[22] Filed: Dec. 28, 1981

Related U.S. Application Data

[60] Continuation-in-part of Ser. No. 845,929, Oct. 27, 1977, Pat. No. 4,214,488, which is a division of Ser. No. 97,132, Nov. 26, 1979, Pat. No. 14,315,751.

[51] Int. Cl.³ .......................................... B22D 11/126
[52] U.S. Cl. ................................. 29/527.4; 474/203; 474/154
[58] Field of Search ................ 474/203, 154; 29/527.4

[56] References Cited

U.S. PATENT DOCUMENTS

| 332,672 | 12/1885 | Mellette et al. | 474/203 |
| 2,856,752 | 10/1958 | Bahr | 474/154 X |
| 4,214,488 | 7/1980 | Conrad | 474/154 |
| 4,315,751 | 2/1982 | Conrad | 474/154 |

*Primary Examiner*—Francis S. Husar
*Assistant Examiner*—V. K. Rising
*Attorney, Agent, or Firm*—Hamrick, Hoffman & Guillot

[57] ABSTRACT

A positive drive system including a coined drive cable (26) having a plurality of regularly spaced nodules (29) rigidly attached along at least a portion of its length, and one or more positive drive sheaves (20, 22, 23, 24) configured to receive the cable and its nodules to provide a positive, nonslip drive engagement between the drive cable and the sheaves.

3 Claims, 10 Drawing Figures

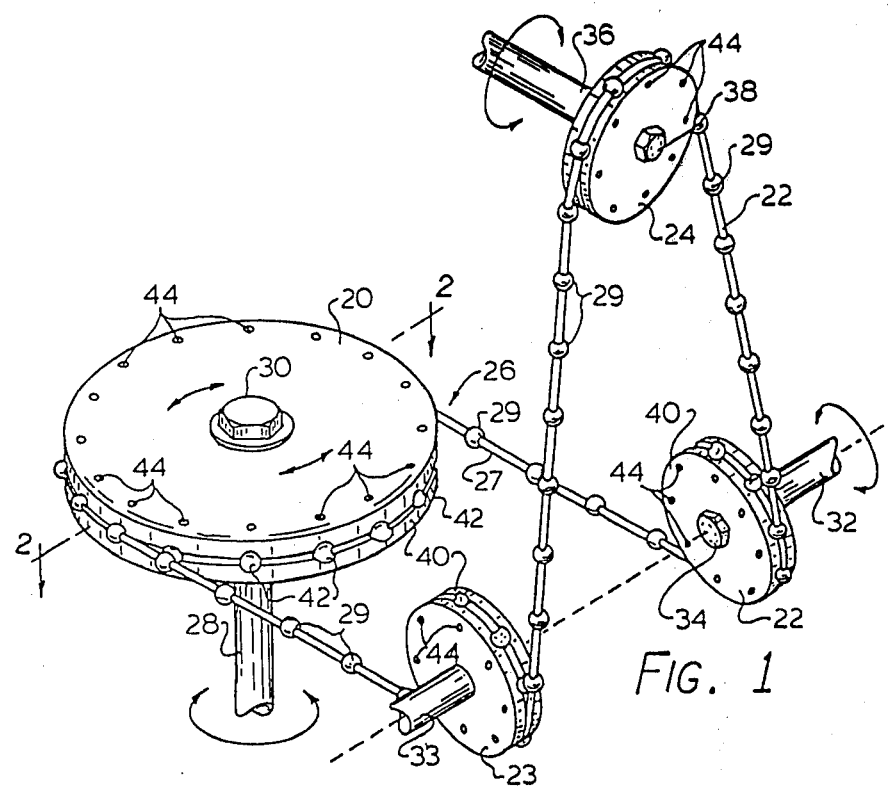
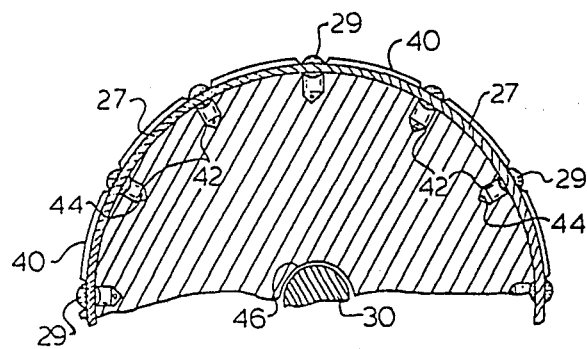
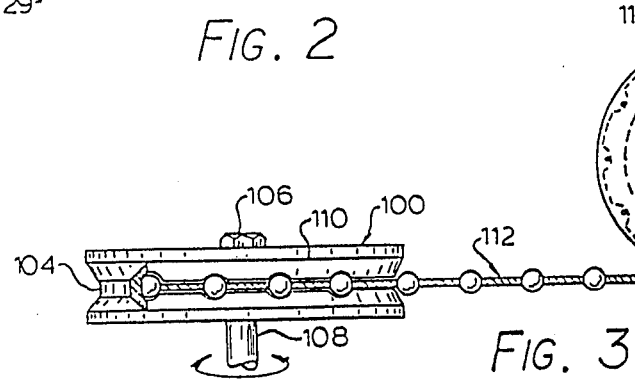

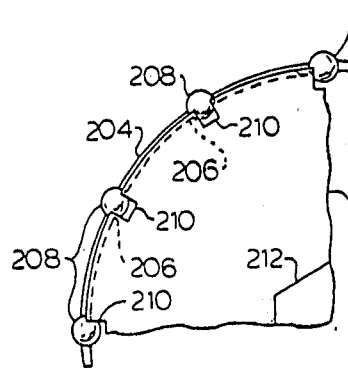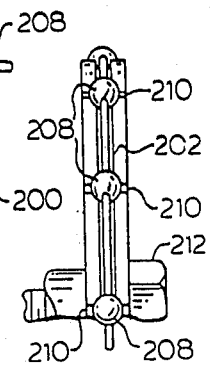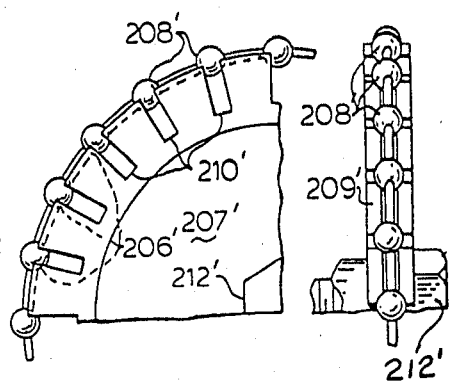
FIG. 4a  FIG. 4b  FIG. 4c  FIG. 4d
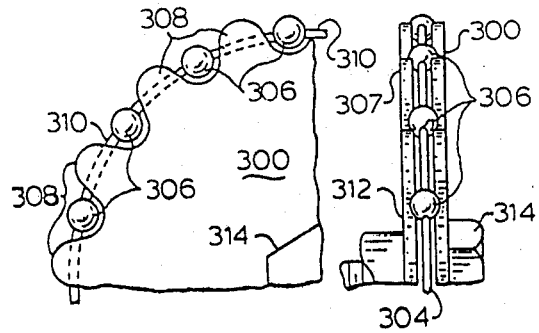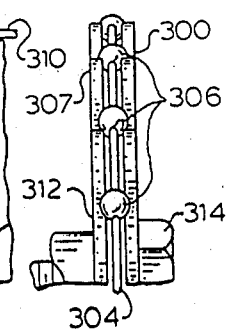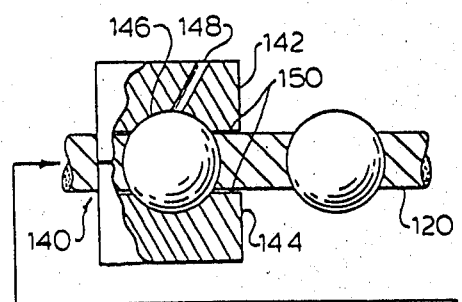
FIG. 5a  FIG. 5b
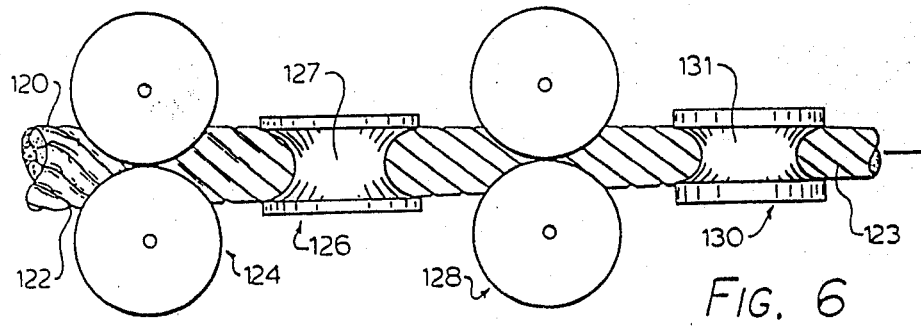
FIG. 6

POSITIVE DRIVE SYSTEM

CROSS REFERENCE TO RELATED APPLICATION

This application is a continuation-in-part of my co-pending U.S. application Ser. No. 845,929 filed Oct. 27, 1977, now U.S. Pat. No. 4,214,488, issued July 29, 1980, and a division of my co-pending U.S. application Ser. No. 97,132 filed Nov. 26, 1979 and now U.S. Pat. No. 4,315,751, issued Feb. 16, 1982

BACKGROUND OF THE INVENTION

1. Field of the Invention

This invention relates generally to pulley drive systems and more particularly to a high strength drive system including a plurality of nodules attached to a coined cable to provide positive rotary drive engagement with a suitably constructed pulley, sheave or sprocket.

2. Description of the Prior Art

Drive systems are used where it is desirable to couple two or more rotary members together for common rotation. Types of drive systems found in the prior art include the V-belt and pulley drive system, the chain and sprocket drive system and the flat belt and sheave drive system.

Every drive system found in the prior art has its own particular strengths and weaknesses which makes it suitable for certain applications but not for others. For instance, drive chain and sprocket systems are very well suited for heavy duty, high torque drive applications, but are not well suited for high speed usage because of the pitch variations caused by excessive wear produced in linkage joints at high RPM's. The V-belt drive system is well suited for high speed applications but not so well suited heavy duty, high torque jobs due to possible belt slippage. A solution suggested by the prior art as to the problem of producing a drive system that both has high load drive capabilities and which may be run at high RPM's is the "silent chain" or "toothed belt" system. Unfortunately, the silent chain is subject to excessive and premature wear and is quite costly to manufacture.

Most drive systems found in the prior art are suitable only for applications where the rotary members to be driven have parallel axes of rotation. This is certainly true in the case of drive chains which have only a very limited ability to twist out of a single plane of rotation and to lesser extent with V-belts which also resist such twisting.

Drive systems such as those disclosed by C. H. Davids in U.S. Pat. No. 538,222 and by G. F. Bahr in U.S. Pat. No. 2,856,752 were developed to overcome some of the limitations found in other prior art drive systems. Both Davids and Bahr disclose bead chain drive systems including a chain consisting of a plurality of beads loosely connected by short links and sheaves having grooves and/or pockets formed about their curved periphery for engagement with the beads in the chain. The bead chain drive systems found in the prior art overcome many of the previously discussed inadequacies of prior art drive systems in that they are relatively inexpensive to manufacture and may drive rotary members whose planes of rotation are not coincident. However, bead chains found in the prior art are still subject to excessive wear at high RPM's and are not suitable for heavy duty drive applications. In fact, they are only suitable for very light duty drive applications.

Thus, the prior art does not provide a single drive system which combines the advantages of inexpensiveness, high RPM durability, high load drive capabilities, constant and accurate drive pitch characteristics and the ability to simultaneously drive rotary members lying in several planes of rotation.

SUMMARY OF THE INVENTION

It is an object of this invention to provide a positive drive system that is simple and inexpensive to manufacture and which is extremely durable and longlasting.

It is a further object of this invention to provide a positive drive system which may be used for high RPM drive applications.

Yet another object of this invention is to provide a positive drive system which is capable of driving high torque loads with precise control and accuracy.

Another object of this invention is to provide a positive drive system for which the drive cable may drive sheaves having axes of rotation in virtually any plane relative to one another.

Yet a further object of this invention is to provide a drive cable which has no moving parts and is especially manufactured for high strength applications.

Still another object of the present invention is to provide a drive cable and method of manufacturing same wherein the cable is coined prior to having registration modules attached.

The above objects have been met with a positive drive system which includes, briefly, a drive cable consisting of a flexible line means having a plurality of nodules situated thereon in a regular, very accurately spaced apart relationship; and a positive drive sheave having a curved surface configuration receptive to the drive cable's nodules so that there is a positive, nonslip rotary drive engagement between the drive cable and the sheave.

An advantage of the present invention is that the drive cable has no moving parts to rattle or wear.

Another advantage of the present invention is that, because the drive cable is symmetrical, it may twist and bend around any number of corners and thus allow the sheaves that it is engaged with to have axes of rotation lying in any number of planes.

Another advantage of the present invention is that the drive cable may be used at a high RPM without excessive wear and may also be used to drive rotary members under high torque conditions without pitch elongation of the drive cable or nodules.

Still another advantage of the present invention is that it provides a drive cable having nodules securely affixed thereto and free of flash at the nodule/cable junctures.

These and other objects and advantages of the present invention will no doubt become apparent to those skilled in the art after having read the following description for the preferred embodiments of the positive drive system as illustrated in the several figures of the drawing.

IN THE DRAWING

FIG. 1 is a perspective view of a positive drive system in accordance with the present invention;

FIG. 2 is a cross-sectional view taken along line 2—2 of FIG. 1 which further illustrates a positive drive sheave shown in FIG. 1;

FIG. 3 illustrates a first alternate embodiment for a positive drive sheave in accordance with the present invention;

FIG. 4a is a partial plan view of a second alternate embodiment for a positive drive sheave in accordance with the present invention;

FIG. 4b is a partial side elevation view of a second alternate embodiment for a positive drive sheave in accordance with the present invention;

FIG. 4c is a partial plan view of a third alternate embodiment for a positive drive sheave in accordance with the present invention;

FIG. 4d is a partial side elevation of a third alternate embodiment for a positive drive sheave in accordance with the present invention;

FIG. 5a is a partial plan view of a fourth alternate embodiment for a positive drive sheave in accordance with the present invention;

FIG. 5b is a partial side elevation view of a fourth alternate embodiment for a positive drive sheave in accordance with the present invention;

FIG. 6 is a partially broken side elevational view illustrating a coining and nodule forming operation in accordance with the present invention.

DESCRIPTION OF THE PREFERRED EMBODIMENT

Referring to FIG. 1, a perspective view of an exemplary cable drive system is shown including a first, second, third and fourth cable drive sheaves 20, 22, 23 and 24, respectively, and a drive cable 26 comprising an endless or closed loop of cable 27 having a plurality of round nodules 29 situated thereon in a regular, spaced apart pattern. Other alternative and related open and closed loop applications are disclosed in my above-identified co-pending application. A nodule, for this discussion, is defined to mean a mass of material formed into any regular external configuration and attached to the drive cable.

In general size and shape, sheaves 20-24 are not dissimilar to V-belt type pulleys such as those commonly used to drive the generator and water pump of an automative engine. In fact, the terms sheaves, pulleys and sprockets will be used almost interchangeably in this specification to refer to rotary members in engagement with a drive cable. Sheave 20 is attached to a shaft 28 by means of a compression bolt 30 which extends through an axial bore formed in the sheave. The compression bolt is tightened on shaft 28 until frictional and compressional forces rigidly lock the sheave and shaft together insuring that a rotation of the shaft will produce a rotation of the sheave and visa-versa. Similarly, sheave 22 is attached to a shaft 32 by a compression bolt 34, sheave 23 is attached to a shaft a compression bolt not seen in this figure and sheave 24 is attached shaft 36 by a compression bolt 38.

About the curved surface of each of the sheaves lies a circumferential groove 40 which is approximately as deep and wide as the diameter of cable 27. In this preferred embodiment the groove is actually 1/64 of an inch larger than the cable to prevent possible binding problems. A plurality of depressions or pockets 42 are equally spaced about the perimeter of each of the sheaves and are centered along groove 40.

Cable 26 is trained around each of the sheaves in an endless loop such that cable 27 resides in slots 40 and a plurality of nodules 29 individually engage one of pockets 42. Obviously, the pitch of the drive cable, i.e., the distance between nodules 29, must be similar to the pitch of the pulleys, i.e., the distance between pockets 42. The engagement of nodules and pockets produces a positive and very accurate nonslip drive between the four sheaves so that as one sleeve is caused to rotate, the drive cable rotates the other sheaves in turn. Note that in the cable drive system of the present invention the axes of rotation of the sheaves need not be parallel, in contrast to the V-belt or chain drive systems found in the prior art. This is clearly shown in FIG. 1 by noting that shafts 28, 33 and 36 are at substantially right angles to one another.

An important concept to understand is that drive cable in accordance with the present invention may drive pulleys that have differing axes of rotation (i.e., lie in different planes of rotation) due to the 360° symmetricality of the drive cable. By the use of suitably disposed sheaves the cable can be trained around corners, over obstacles and through otherwise almost inaccessible apertures to drive or connect rotating or reciprocating members.

Each of the sheaves are provided with a plurality of air vents or bores 44 formed through the sheave pockets so that air compression will not occur as nodules 29 engage the pockets, and also reduce noise to an acceptable level. Vents 44 further serve to prevent any grease or other foreign matter from collecting within, and eventually filling, the pockets by providing an escape route for such waste. The vents, in the present embodiment, extend axially through the sheaves so that the pockets are redundantly vented.

Referring now to FIG. 2, which shows a cross-sectional view of sheave 24 taken along lines 2—2 of FIG. 1, it is possible to explain in greater detail the construction of a sheave of the preferred embodiment. Pockets 42 can be seen to extend radially inwardly as cylindrical bores tapering to generally conical terminations and vent holes 44 can be seen to connect the pockets with the ambient environment to prevent air compression.

In this preferred embodiment contact between nodules 29 and the pockets is confined to the lip of the pocket and to a circular portion of the nodule's exterior. Because the nodules are prevented from slapping the bottom and/or sides of the pockets much undue noise and wear is prevented.

Groove 40 is suitably deep and wide to fully accept cable 27, which helps prevent the cable from slipping or jumping off the sheave. Also seen is a cross-section of part of a compression bolt or shaft extending through bore 46 in the sheave.

This particular sheave type is well suited for medium duty, high speed applications where low noise and long wear are critical factors. The sheave may be made from many suitable materials such as steel, cast iron, aluminum, plastic or rubber.

An alternate construction for a positive drive sheave, as illustrated in FIG. 3, includes a pair of V-belt pulleys 100 and 102 each having an inwardly tapering, trapezoidal groove 104 circumferentially formed about its curved perimeters. The pulleys are attached by compression bolts 106 to shafts 108. An insert 110 is disposed within groove 104 in each of the pulleys to provide a curved surface suitable for engagement with a drive cable 112. In fact, after insert 110 is added to the V-belt pulley, the pulley closely resembles the sheave previously discussed. The advantage of the pulley of this embodiment is that V-belt pulleys in an existing system, such as on an automobile, may be modified for use with the more efficient cable drive system.

Insert 110 may be manufactured and attached to the V-belt pulleys in many ways: One preferred method of manufacture is to cast a flexible material such as hard rubber or urethane into semicurcular sections and then to assemble them within the V-belt groove. The inserts may then be retained in the groove by any number of state-of-the-art adhesives, which usually create a bond that is at least as strong as the materials being bonded.

Another method for adding an insert is to injection mold or die-cast a single piece insert 110 directly into the V-belt pulley groove. This method produces an insert with a far superior strength due its one piece construction. Before casting or injection molding an insert, it is preferred that V-belt groove 104 be provided with a number of small holes or slots so that the injected material comprising insert 110 will form fingers or tabs of material which firmly grip the V-belt slot to prevent the inserted material from rotating therein.

Yet another alternate method for producing a modified V-belt pulley is to insert, mold or cast a blank insert into the groove and then machine a groove and a plurality of pockets on its curved surface so that it is suitable to receive the flexible lines means and nodules, respectively, of drive cable 112. Such machining can be quickly and easily done on a standard industrial lathe by rotating the workpiece (the V-belt pulley and insert blank) against a cutting tool to produce the circumferential groove and then circularly indexing the work piece and forming the pockets with a suitable boring tool.

The modified V-belt pulley of the present invention is suitable for use in a relatively high speed and heavy duty drive system. The nodules in this embodiment contact the entire inner surface of the pockets to produce a strong engagement as compared with the previous embodiment which had only partial nodule/pocket contact. Again each pocket is provided with a vent hole which further doubles as an exit channel for foreign matter which would otherwise become compacted in the pockets.

If insert 110 in this V-belt embodiment were constructed of a hard material the system would operates fairly noisily due to the slapping of the ball against the bottom of the pocket at high speed. However, by using flexible, resilient materials such as rubber or soft plastic for the nodules and/or for the pulley inserts this problem is overcome.

Referring now to FIGS. 4a–d a second and third alternate embodiment for positive drive system sheaves are shown in quarter view. The second alternate embodiment illustrated in FIGS. 4a and 4b, is typically made of a metal alloy such as steel which is manufactured by either machining a blank or by casting molding it in a more finished form. Pulley 200 is provided with a circumferential groove 202 to accept a cable 204, which in this present embodiment is not deep enough to fully engulf the cable. Pockets 206 are provided for engagement with nodules 208. The nodules do not quite contact the bottom of the pockets. Side slots 210 are formed to vent pockets 206 and further serve as cleaning ports through which nodules 208 may expel dirt or grime. This embodiment is suitable for medium high speed, medium high load drive system applications due to relatively great pocket/nodule contact. In this embodiment the sheave is also attached to a shaft by means of a compression bolt 212.

The third alternate embodiment for a positive drive sheave as shown in quarter view in FIGS. 4c and 4d is, in theory, quite similar to the embodiment just discussed. It may be seen, however, that this third embodiment has a greater number of pockets 206 formed per unit length around its perimeter and that the side slots 210' of the pockets are much deeper. Furthermore, the sleeve is made in two parts, the first being an annular core 207' which is typically made from a metal alloy and the second part being an annular ring 209' which is made from a soft material such as rubber or plastic. Alternatively, the entire sheave may be made from a soft material. The pockets are closer together in this embodiment and the nodule contacts virtually 100% of the pocket so that the pressure exerted by the nodules on the pockets of the soft material is more evenly distributed. The soft ring also allows for production inaccuracies of drive cable pitch by slightly deforming to accept the nodules.

Previously discussed embodiments may be unsafe should a sheave bearing freeze and the drive cable snap, possibly injuring a nearby person. In this alternate embodiment, if a bearing should freeze, the soft metal material of annular ring 209' would yield in order to save the cable.

The flexibility of the cable is an important design factor in the present invention, particularly if the drive cable makes many twists or turns. Flexibility is realized in metal cables by using a large number of small diameter wires, by preforming the drive cable loop into the desired final configuration and by using special strand winding techniques, such as the lang lay, which are well known to those skilled in the art.

Cable strength for high torque drive applications may be insured by employing cables having high carbon, cold drawn cores. If it is imperative that the nodules wear evenly, a right or left hand cable strand lay may be used to cause the cable to precess as it is driven, insuring even wear on all sides of the nodules.

Of course, there are a large number of cable types and other flexible line means which are eminently suitable for various applications of the positive drive system of the present invention. It is therefore intended that this invention not be limited to any particular type but to include any and all suitable flexible line or cable means which may be coined or otherwise formed to reduce the internal wire strand movement.

Referring now to FIG. 6 of the drawing, the manufacture of a cable in accordance with the present invention is shown. Although numerous cable sizes and configurations can be used, a preferred cable for use in the present invention is a 7×19 aircraft, preformed, galvanized and lubricated cable shown at 120. This cable consists of 7 strands of twisted 19-wire sub-cable with one of them forming a center strand and the other 6 strands being helically wound about the center strand. As indicated at 122, the twisted multi-strand cable 120 manifests deep and large helical grooves between each individual strand. These grooves make it difficult to cast, mold, swage or otherwise form nodules onto the cable due to the tendency of the nodule forming material to leak or "flash" during the forming operation. In order to provide a suitable cable surface upon which a steel or other metal, or even plastic nodules may be formed, and to in addition reduce cable chaffing as the cable twists and turns on its supporting pulleys, the preferred drive cable is first processed through several stages of coining wheels which compact the cable strands, reduce the cable diameter and at the same time reduce the dimensions of the helical grooves 122 to but thin slits as indicated at 123.

The several sets of coining wheels are illustrated at 124, 126, 128 and 130. As will be noted, the rotational plane of the second coining set 126 is angularly rotated relative to the corresponding plane of the coining set 124; the coining set 128 is similarly rotated relative to coining set 126; and set 130 is likewise rotated relative to set 128.

The cross-sectional dimensions of the grooves are semicircular in configuration, and as can be noted by comparing the grooves 127 of wheels 126 to the grooves 131 of wheels 130, the diameters of the grooves of each successive set in the series of 4 or more sets are reduced slightly so as to progressively "coin" the cable as it passes therethrough. For example, it will be noted that in passing through wheel set 124 the exterior cable surfaces are slightly compressed and are thereafter further compressed in steps until upon emerging from wheel set 130 the outer diameter of cable 122 is in substantially cylindrical form with the cable grooves being reduced to very thin slits as illustrated at 123. In the preferred embodiment the outer diameter of the cable is reduced from 4-12% by the coining operation.

One method of attaching nodules to the coined cable is also shown in FIG. 6 at 140. The illustrated casting or molding method utilizes a unit which consists of a pair of mating parts 142 and 144 which when mated together over the coined cable define and internal cavity 146 having the size and shape of a particular type of nodule to be formed on the cable. The part 142 includes a fill passage 148 through which molten material may be poured or injected into the cavity 146. It will be appreciated that since the semicylindrical surfaces 150 at each end of unit 140 are selected to be of substantially the same diameter as the coined diameter of cable 120 and since the size of the slits 123 are so small that the molten metal can not leak or flash therethrough the nodule will have a near perfect configuration and will be suitably bonded to the surface of the coined cable.

Alternatively, sintering or swaging techniques may be used to form the nodules on the coined cable. However, in any case the fact that the cable has been previously coined tends to produce more uniform nodules that adhere better to the cable and include virtually no metal flash. As a result, the small bits or pieces of metal which occur in prior art configurations due to improper fit between the molds (or dies) and the cable are eliminated. It will also be appreciated that since the cable is already compacted to a substantial degree, application of the nodules using cold press, sintering or swaging methods does not tend to elongate the cable. As a result, nodules pitch is maintained very accurately.

With respect to the various ways in which the cable ends may be attached to each other to form a closed loop, reference is made to the above-identified co-pending application Ser. No. 845,929, which is incorporated herein by reference.

Although the present invention has been described above with reference to particular preferred embodiments, it is contemplated that many alterations and modifications will become apparent to those skilled in the art after having read this disclosure. It is therefore intended that the appended claims be interpreted as covering all such alterations and modifications as fall within the true spirit and scope of the invention.

What is claimed is:
1. A method of making a drive cable for a positive drive system, comprising:
   passing a length of flexible multi-strand wire cable through a series of sets of coining wheels which compress the cable strands and deform the outer surface of said cable to provide a coined cable; and
   forming a plurality of nodules on said coined cable at regular spaced intervals.
2. A method of making a drive cable for a positive drive system as recited in claim 1 wherein the compression of said cable reduces its outer diameter by from 4 to 12 percent of its original diameter.
3. A method of making a drive cable for a positive drive system as recited in claim 2 wherein said nodules are formed on said coined cable by molding.

* * * * *